(12) United States Patent
Mizuuchi et al.

(10) Patent No.: US 7,786,954 B2
(45) Date of Patent: Aug. 31, 2010

(54) ADJUSTABLE HEAD-MOUNT TYPE DISPLAY DEVICE

(75) Inventors: Takayuki Mizuuchi, Chiba (JP); Kensaku Abe, Saitama (JP)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 11/521,457

(22) Filed: Sep. 15, 2006

(65) Prior Publication Data

US 2007/0057867 A1     Mar. 15, 2007

(30) Foreign Application Priority Data

Sep. 15, 2005   (JP)   ............................... 2005-268901

(51) Int. Cl.
*G09G 5/00*   (2006.01)
(52) U.S. Cl. ......................................................... 345/8
(58) Field of Classification Search .............. 345/1.1–9; 351/41–178; 359/465, 443
See application file for complete search history.

(56) References Cited

U.S. PATENT DOCUMENTS 4,988,183 A * 1/1991 Kasahara et al. ............ 351/210
6,172,808 B1 * 1/2001 Foreman et al. ............. 359/481
6,215,460 B1 * 4/2001 Mizoguchi et al. ............. 345/8
6,307,673 B1 * 10/2001 Hirunuma et al. ........... 359/416

FOREIGN PATENT DOCUMENTS

| JP | 6-276459 | 9/1994 |
| JP | 8-122715 | 5/1996 |

* cited by examiner

*Primary Examiner*—Chanh Nguyen
*Assistant Examiner*—Long Pham
(74) *Attorney, Agent, or Firm*—Oblon, Spivak, McClelland, Maier & Neustadt, L.L.P.

(57) ABSTRACT

A head-mount type display device has a first display unit for left eye, a second display unit for right eye, a guide that guides the first and second display units to slide them in a longitudinal way, and an adjustment mechanism that adjust a distance between the first and second display units. The adjustment mechanism includes a revolving member having a shaft, a left-side arm having a first end that rotatively connects the first display unit and a second end that rotatively connects the revolving member, and a right-side arm having a third end that rotatively connects the second display unit and a fourth end that rotatively connects the revolving member. When the revolving member revolves around the shaft, the first and second display units slide by a same distance from the shaft in the longitudinal way along the guide.

3 Claims, 5 Drawing Sheets

ADJUSTABLE HEAD-MOUNT TYPE DISPLAY DEVICE

CROSSREFERENCE TO RELATED APPLICATION

The present invention contains subject matters related to Japanese Patent Application JP 2005-268901 filed in the Japanese Patent Office on Sep. 15, 2005, the entire contents of which being incorporated herein by reference.

BACKGROUND OF THE INVENTION

1. Field of the Invention

The present invention relates to a display device, and more particularly, to a head-mount type display device.

2. Description of Related Art

A head-mount type display device relates to a display device by which a video image or the like can be displayed when mounting it on a head of a user, thereby enabling the user to see or feel any virtual image that is identical to one displayed on a large screen. It is easy to see such the virtual image if the display device could be adjusted so that the virtual image is correctly suitable for a distance between eyes of the user.

The head-mount type display device has set larger an effective region in which the image can be displayed to correspond with any personal differences in distances between eyes of the users by enlarging an effective area in the display device to irradiate the image to right and left eyes of the user. When, however, setting the effective region larger, lens assembly itself to be used for irradiating the image to the eyes of the user may be physically made large depending on it. This may cause a body of the head-mount type display device to be scaled up.

Thus, it has been hopeful that an adjustment mechanism for adjusting the head-mount type display device so that the virtual image is correctly suitable for a distance between eyes of the user is provided without changing a scale of the head-mount type display device.

Japanese Patent Application Publication No. H06-276459 has disclosed a head-mount type display device having an adjustment mechanism for adjusting the head-mount type display device so that a scale of the virtual image is correctly suitable for a distance between eyes of the user by using a rack and pinion. Alternatively, Japanese Patent Application Publication No. H08-122715 has disclosed a frame of a pair of glasses in which an equipped adjustment mechanism can adjust the frame to fit to a width of face of a user by using a rack and pinion.

SUMMARY OF THE INVENTION

They, however, have used the rack and pinion as a gear to adjust the display device and the frame. If large numbers of the general public uses the display device and the frame to adjust them frequently so as to fit to a distance between eyes of the user, they may fail.

It is desirable to provide a head-mount type display device equipped with an adjustment mechanism, which has a simple configuration to prevent any failure, for adjusting a distance between display units to fit to a distance between eyes of a user, in order to correspond with any personal differences in distances between eyes of persons without changing a scale of the head-mount type display device.

According to an embodiment of the present invention, there is provided a head-mount type display device that mounts on a head of a person to operate. The head-mount type display device has a first display unit for left eye of the person to irradiate an enlarged image to the left eye thereof and a second display unit for right eye of the person to irradiate the enlarged image to the right eye thereof. The head-mount type display device also has a guide that guides the first and second display units to slide them in a longitudinal way, and an adjustment mechanism that adjust a distance between the first and second display units. The adjustment mechanism includes a revolving member having a shaft, which is positioned between the first and second display units, and revolving around the shaft. The adjustment mechanism also includes a left-side arm having a first end that rotatively connects the first display unit and a second end that rotatively connects the revolving member at a first position therein from which the shaft is away by a predetermined distance, and a right-side arm having a third end that rotatively connects the second display unit and a fourth end that rotatively connects the revolving member at a second position therein from which the shaft is away by the predetermined distance. The second position faces the first position. When the revolving member revolves around the shaft, the first and second display units slide by a same distance from the shaft in the longitudinal way along the guide.

In this embodiment of the invention, the first display unit for left eye of the person irradiates an enlarged image to the left eye thereof and a second display unit for right eye of the person irradiates the enlarged image to the right eye thereof. If a user directs his or her eyes toward the first and second display units, this allows the user to see or feel any virtual big image that is identical to one displayed on a large screen.

The first and second display units are respectively arranged in a longitudinal way so that they can correspond to each of the right and left eyes of a user. The guide guides the first and second display units to slide them in the longitudinal way. The guide has two rails that are arranged up and down in parallel. The first and second display units lie between the two rails.

Frame positioned on a side of each of the first and second display units has grooves each for receiving the rail on its upper and lower side surfaces, so that the user can slide the first and second display units along the rails in the longitudinal way.

In the adjustment mechanism, a revolving member having a shaft, which is positioned between the first and second display units, revolves around the shaft. The adjustment mechanism also includes two arms each having the same length. The two arms respectively connect the revolving member and each of the first and second display units. This allows the first and second display units to slide by a same distance from the shaft in the longitudinal way.

The two arms includes a left-side arm having a first end that rotatively connects the first display unit and a second end that rotatively connects the revolving member at a first position therein, and a right-side arm having a third end that rotatively connects the second display unit and a fourth end that rotatively connects the revolving member at a second position therein. The first position is away from the shaft by a predetermined distance. The second position faces the first position across the shaft. The second position is away from the shaft by a distance identical to the distance between the first position and the shaft.

When the user slides the first display unit or the second display unit in the longitudinal way, this slide enables the revolving member to revolve. This allows the adjustment mechanism to adjust a distance between the first display unit connected with the left-side arm and the second display unit connected with the right-side arm so that the first and second display units can slide by a same distance from the shaft in the longitudinal way.

Thus, the adjustment mechanism in the head-mount type display device is made simple, thereby reducing its costs. Further, this embodiment of the head-mount type display device is made more trouble-free as compared with a case where the head-mount type display device has a rack and pinion as a gear.

Alternatively, a large revolving member may be used so that the user could manipulate the revolving member directly. In this case, the revolving member has a circular shape or an equilateral polygonal shape to allow the user to manipulate it easily. When the revolving member has a circular shape, its diameter is longer than a distance between the rails so that the user can manipulate an upper or lower portion of the revolving member by his or her finger(s).

This allows the distance between the first and second display units to be adjusted so that they can be slid by a same distance from the shaft in the longitudinal way, only if the user manipulates and rotates an edge of the revolving member by his or her finger(s).

According to another embodiment of the present invention, the left-side arm connecting the first display unit and the revolving member may include two left-side sub-arms, a first left-side sub-arm and a second left-side sub-arms, as well as the right-side arm connecting the second display unit and the revolving member may include two right-side sub-arms, a first right-side sub-arm and a second right-side sub-arm.

The first left-side sub-arm extends in the longitudinal way and has the first end that is fixed to the first display unit and a fifth end. The second left-side sub-arm has the second end that rotatively connects the revolving member at the first position therein that is away from the shaft by a predetermined distance and a sixth end. The fifth end of the first left-side sub-arm rotatively connects the sixth end of the second left-side sub-arm.

Similarly, the first right-side sub-arm extends in the longitudinal way and has the third end that is fixed to the second display unit and a seventh end. The second right-side sub-arm has the second end that rotatively connects the revolving member at the second position therein that is away from the shaft by a distance identical to the distance between the first position and the shaft and an eighth end. The seventh end of the first right-side sub-arm rotatively connects the eighth end of the second right-side sub-arm.

Thus, the first left-side sub-arm and the first right-side sub-arm extend in the longitudinal way and are fixed to the first and second display units so that only the second left-side sub-arm and the second right-side sub-arm can moved accompanying with the revolving of the revolving member. This allows any spaces to be provided on upper and lower portions of the first left left-side sub-arm and the first right-side sub-arm, thereby enabling these spaces to be effectively utilized.

According to the embodiments of the head-mount type display device relative to the invention, by providing the adjustment mechanism in which the revolving member has the shaft between the first and second display units and is connected to each of the first and second display units via the arms, it is possible to adjust the distance between the first and second display units when the revolving member revolves so that the first and second display units can slide by a same distance from the shaft in the longitudinal way. This allows the adjustment mechanism to be made more trouble-free and simple.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe a head-mount type display device according to preferred embodiments of the present invention with reference to drawings.

Figure 1:
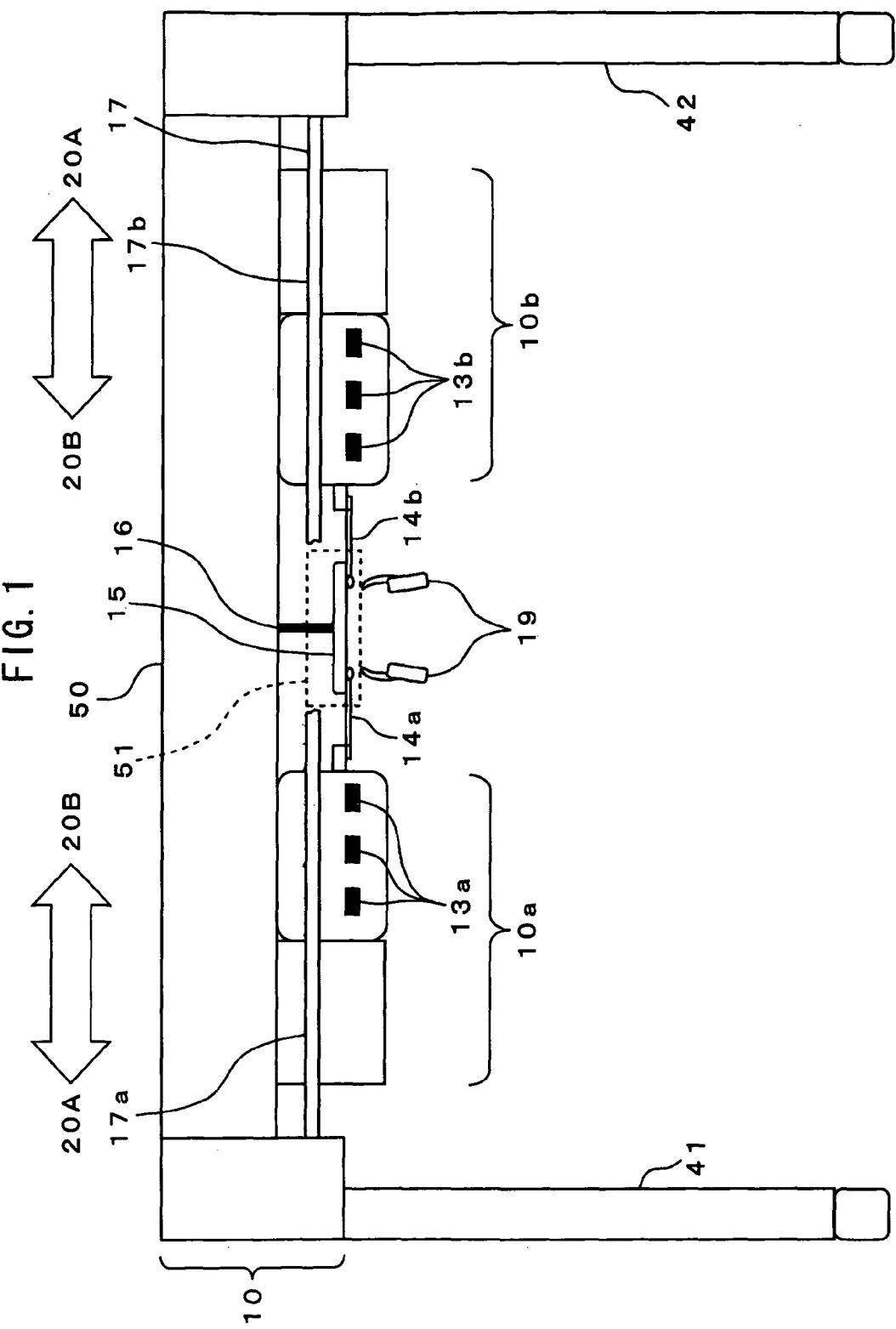
FIG. 1 is an illustration for illustrating a configuration of a first embodiment of a head-mount type display device according to the invention.
Figure 2:
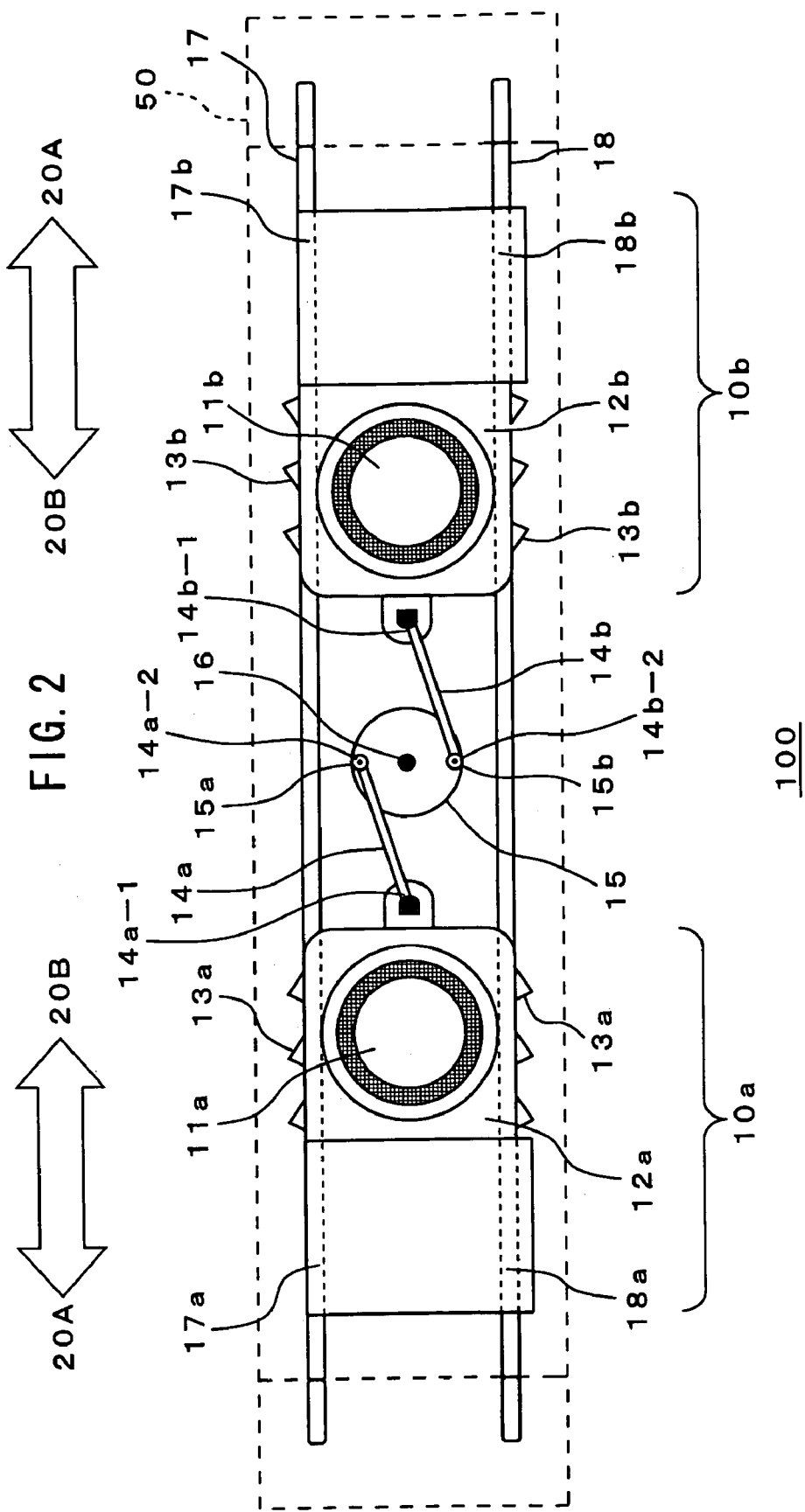
FIG. 2 is an illustration for illustrating a configuration of the first embodiment of the head-mount type display device as seen from eyes of a user.

FIG. 1 illustrates a configuration of a first embodiment of a head-mount type display device according to the invention. FIG. 2 also illustrates a configuration of the first embodiment of the head-mount type display device as seen from eyes of a user. The following will describe the head-mount type display device 100 as the first embodiment with reference to FIGS. 1 and 2.

The head-mount type display device 100 has a frame body 10 and temples 41, 42 that are connected with the frame body 10 to allow the display device 100 to be mounted on a head of the user. The frame body 10 is worn so that it can be positioned before a face of the user. The frame body 10 is mounted on the head of the user by putting the temple 41 on left ear of the user and the temple 42 on right ear thereof.

The frame body 10 is equipped with a cover 51 at a position where a nose of the user touches it. Nose pads 19 are provided on a side of the cover 51. The user puts the nose pads 19 on his or her nose and prevents the frame body 10 from sliding down the nose.

It is to be noted that, for example, an earphone for hearing audio, which is not shown, may be connected with the frame body 10.

A cover 50 is attached to a front side, upper and lower sides, and left and right sides of the frame body 10 in order to prevent any daylight from being brought into inside. Two holes are provided in each of the left and right inside surfaces of the cover 50. Tips of two up and down rails, namely, a rail 17 and a rail 18 are inserted into the holes with the rails 17, 18 being parallel to each other. A display unit 10*a* and a display unit 10*b* are arranged therebetween in a longitudinal way. The display unit 10*a* and the display unit 10*b* respectively constitute a display unit for left eye of the user and a display unit for right eye thereof. The rails 17, 18 constitute a guide.

Although not shown, the display unit 10a includes a display section for left eye thereof and an optic to irradiate an enlarged image to the left eye thereof. Similarly, the display unit 10b includes a display section for right eye thereof and an optic to irradiate the enlarged image to the right eye thereof. The display units 10a, 10b include a lens 11a and a lens 11b, respectively, to which the user directs his or her eyes. Frames 12a, 12b are respectively attached to cover upper and lower sides and left and right sides thereof.

The frame 12a has grooves 17a, 18a for allowing the rails 17, 18 to be received on its upper and lower surfaces. The frame 12b has grooves 17b, 18b for allowing the rails 17, 18 to be received on its upper and lower surfaces.

The user might push ridges 13a, 13b, which are provided on and under each of the frames 12a, 12b, toward in a longitudinal way so that the display units 10a, 10b can be slid in the longitudinal way along each of the rails 17, 18.

The following will describe, with reference to FIG. 2, an adjustment mechanism by which a user adjusts a distance between the display unit 10a and the display unit 10b so that the display units 10a, 10b can slide to accord with a distance between his or her eyes. It is to be noted that in FIG. 2, the temples 41, 42, the cover 51, and the nose pads, which have been shown in FIG. 1, will be omitted.

The display unit 10a fixes a lens 11a through which the user look. The frame 12a covers a side of the display unit 10a. The frame 12a has the ridges 13a on its upper and lower surfaces in order to prevent finger(s) of the user from slipping.

Similarly, the display unit 10b fixes a lens 11b through which the user look. The frame 12b covers a side of the display unit 10b. The frame 12b has the ridges 13b on its upper and lower surfaces in order to prevent finger(s) of the user from slipping.

The display sections fixed on the display units 10a, 10b, respectively, display an image such as a video image. Each optic enlarges the image as a virtual image. When a user directs his or her left eye toward the lens 11a and his or her right eye toward the lens 11b, respectively, light irradiated from each optic is projected on retina of each eye of the user so that the user can see or feel a virtual big image that is identical to one displayed on a large screen.

A revolving shaft 16 is provided between the display units 10a, 10b. The evolving shaft 16 is fixed on the cover 50. The revolving member 15 revolves around the revolving shaft 16. The revolving member 15 is provided so that it can be parallel with a face of the user. The revolving member 15 is connected with the display units 10a, 10b, via arms 14a, 14b, respectively. The arms 14a, 14b have the same length.

The arm 14a has an end 14a-1 that rotatively connects the frame 12a on a right side thereof and the other end 14a-2 that rotatively connects the revolving member 15 at a connecting position 15a therein from which the revolving shaft 16 is away by a predetermined distance such as a distance somewhat less than a radius of the revolving member 15. The connecting position 15a constitutes a first position.

The arm 14b has an end 14b-1 that rotatively connects the frame 12b on a left side thereof and the other end 14b-2 that rotatively connects the revolving member 15 at a connecting position 15b therein from which the revolving shaft 16 is away by the predetermined distance that is identical to the distance between the revolving shaft 16 and the connecting position 15a. The connecting position 15b faces the connecting position 15a across the revolving shaft 16. The connecting position 15b constitutes a second position. As shown in FIG. 2, the connecting positions 15a, 15b and the revolving shaft 16 are aligned to each other.

When the user slides the ridges 13a and/or 13b by his or her finger(s) in a longitudinal way, the revolving member 15 revolves around the revolving shaft 16 via the arms 14a, 14b. This allows a distance between the display units 10a, 10b to be adjusted so that they can slide by a same distance from the revolving shaft 16 in the longitudinal way.

Figure 3:
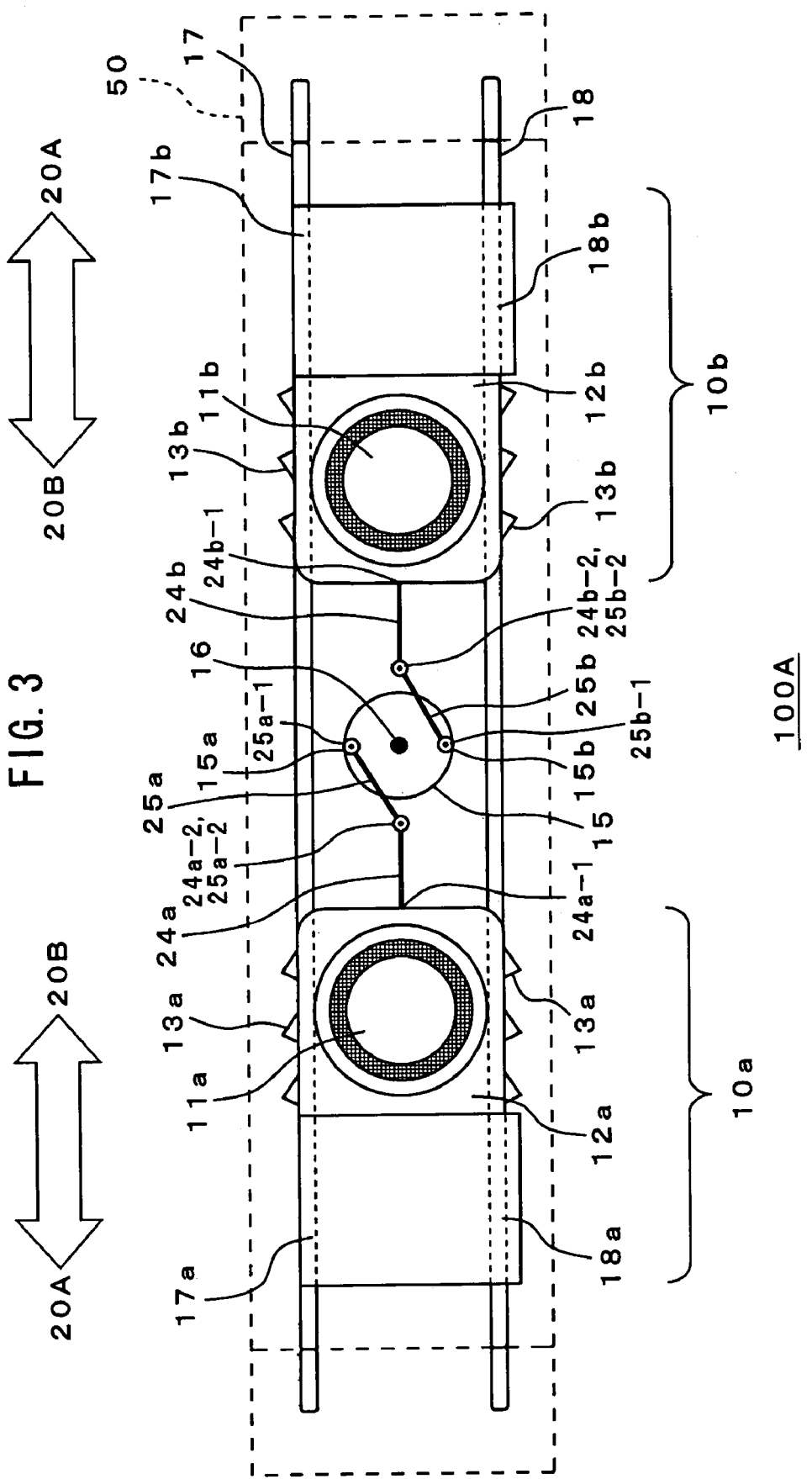
FIG. 3 is an illustration for illustrating a configuration of a second embodiment of a head-mount type display device according to the invention.

The following will describe a head-mount type display device 100A as a second embodiment of the present invention with reference to FIG. 3. In this FIG. 3, like reference characters refer to like elements shown in FIG. 2, detailed description of which will be appropriately omitted.

In the head-mount type display device 100A shown in FIG. 3, the revolving member 15 is connected with the display unit 10a via sub-arms 24a, 25a and the display unit 10b via sub-arms 24b, 25b, respectively.

The sub-arm 24a extends in the longitudinal way, in other words, is provided so that it can be parallel with the rails 17, 18. The sub-arm 24a has an end 24a-1 that is fixed to a right side of the frame 12a and the other end 24a-2. The sub-arm 25a has an end 25a-1 that rotatively connects the connecting position 15a of the revolving member 15 and the other end 25a-2. The other end 24a-2 of the sub-arm 24a rotatively connects the other end 25a-2 of the sub-arm 25a. The sub-arm 24a constitutes a first left-side sub-arm and the sub-arm 25a constitutes a second left-side sub-arm.

Similarly, the sub-arm 24b extends in the longitudinal way. The sub-arm 24b has an end 24b-1 that is fixed to a left side of the frame 12b and the other end 24b-2. The sub-arm 25b has an end 25b-1 that rotatively connects the connecting position 15b of the revolving member 15 and the other end 25b-2. The other end 24b-2 of the sub-arm 24b rotatively connects the other end 25b-2 of the sub-arm 25b. The sub-arm 24b constitutes a first right-side sub-arm and the sub-arm 25b constitutes a second right-side sub-arm.

Thus, when the user slides the ridges 13a and/or 13b by his or her finger(s) in a longitudinal way, the revolving member 15 revolves around the revolving shaft 16. The sub-arms 24a, 24b are fixed to prevent them from being pitched, so that only the sub-arms 25a, 25b can be moved accompanying with the revolving of the revolving member 15. This allows spaces to be produced on and under the sub-arm 24a, 24b to be effectively utilized.

Figure 4:
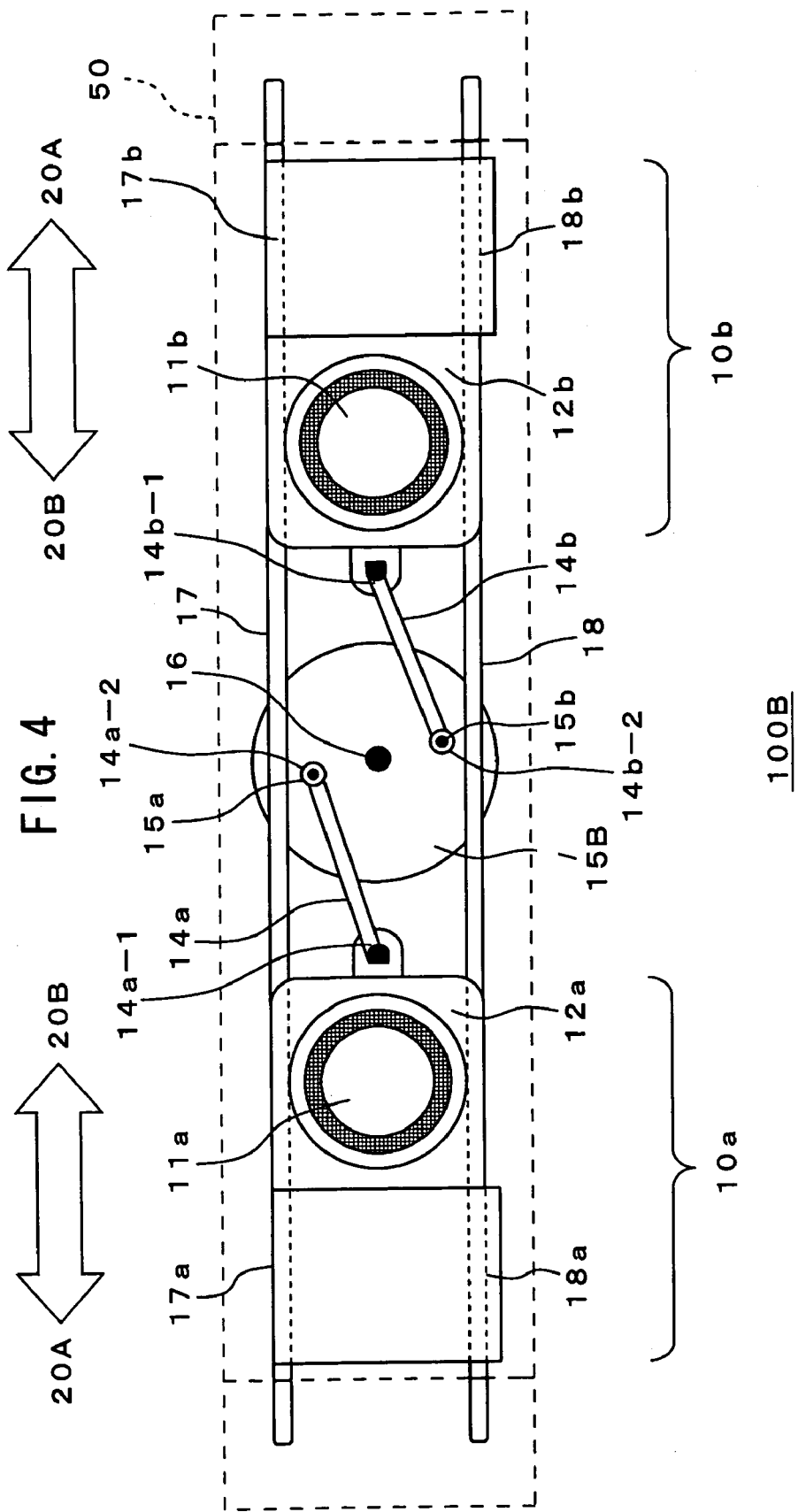
FIG. 4 is an illustration for illustrating a configuration of a third embodiment of a head-mount type display device according to the invention.

The following will describe a head-mount type display device 100B as a third embodiment of the present invention with reference to FIG. 4. In this FIG. 4, like reference characters refer to like elements shown in FIG. 2, detailed description of which will be appropriately omitted.

The head-mount type display device 100B shown in FIG. 4 has the revolving member 15B and the revolving shaft 16 between the rails 17, 18. The revolving member 15B has a diameter larger than a distance between the rails 17, 18.

Thus, the revolving member 15B is made larger and when the user rotates the revolving member 15B by his or her finger(s), the revolving member 15B revolves around the revolving shaft 16. This allows a distance between the display units 10a, 10b to be adjusted so that the display units 10a, 10b can slide by a same distance from the revolving shaft 16 in the longitudinal way. An edge of the revolving member 15B may be milled to prevent a finger of the user from slipping.

Figure 5:
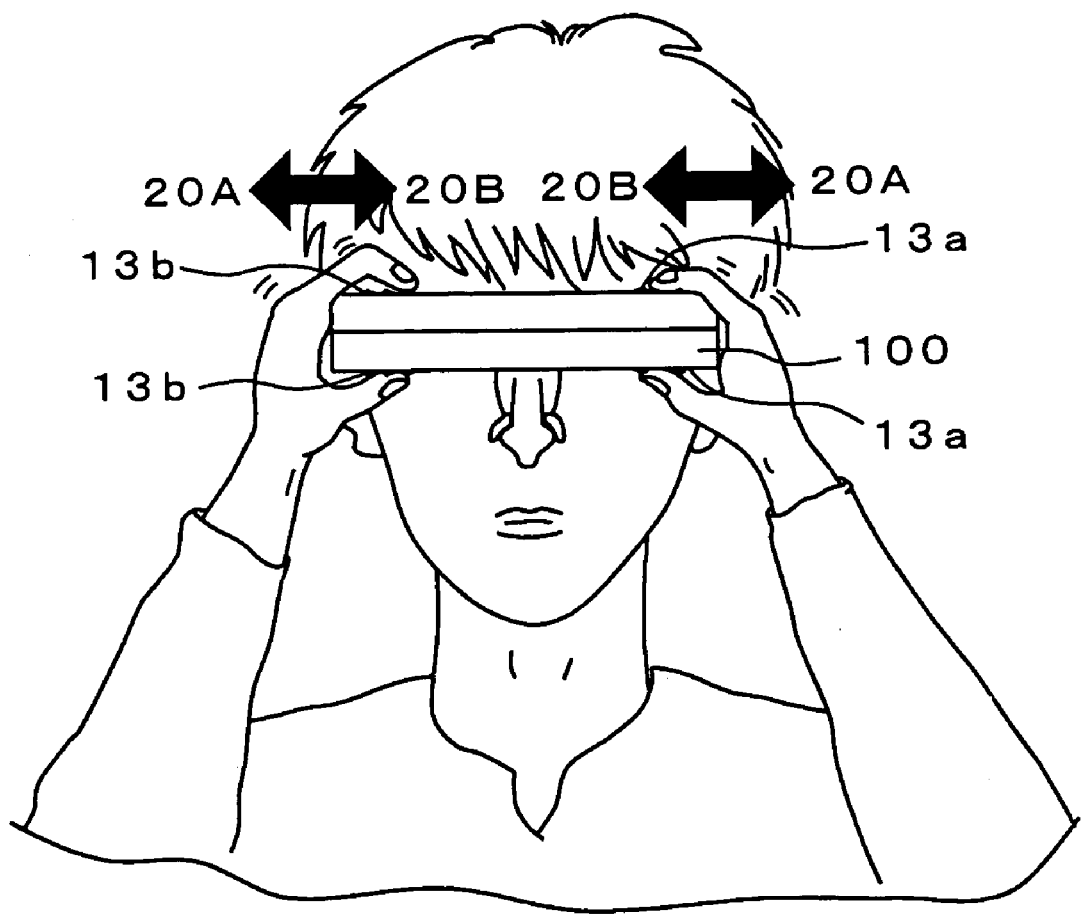
FIG. 5 is a drawing for showing usage of the first embodiment of a head-mount type display device according to the invention.

FIG. 5 shows usage of the head-mount type display device 100 according to the first embodiment. The following will describe operations of the head-mount type display device 100 when the user adjusts the distance between the display units 10a, 10b.

First, the user fits the frame body 10 to be mounted on his or her head by putting the temples 41, 42 on his or her ears and putting the nose pads 19 on his or her nose.

Next, the user puts his or her fingers on the ridges 13a, 13b to push them toward reverse directions to each other, as shown in FIG. 5, so that the display units 10a, 10b can slide toward reverse directions to correspond the lenses 11a, 11b to his or her left and right eyes. Similar operations may be carried out in the head-mount type display device 100B. When, however, using the head-mount type display device 100B, the user rotates the revolving member 15B by his or her finger(s) to adjust the distance between the display units 10a, 10b so that the lenses 11a, 11b can be corresponded to his or her left and right eyes.

In all the embodiments, if the user wants to adjust the distance between the display units 10a, 10b larger, the display units 10a, 10b slide in a direction along an arrow 20A shown in FIGS. 1 through 5. If the user wants to adjust the distance between the display units 10a, 10b smaller, the display units 10a, 10b slide in a direction along an arrow 20B shown in FIGS. 1 through 5. This enables the revolving member 15 (15B) connected to the display units 10a, 10b via the arms (the sub-arms) to revolve, thereby sliding the display units 10a, 10b by a same distance from the revolving shaft 16 in the longitudinal way.

All of the head-mount type display devices 100, 100A, 100B have the adjustment mechanisms each having a simple configuration, thereby reducing the costs.

Such the adjustment mechanisms are made more trouble-free as compared with a case where the adjustment mechanism has a rack and pinion as a gear. This allows the head-mount type display device to be used in a location such as an amusement arcade in which large numbers of the general public uses the display device to adjust the distance between the display units frequently.

Although the revolving member 15 or 15B has described to have a circular shape, the revolving member may have an equilateral polygonal shape or be formed as being rod.

Although, in any of the above embodiments, the revolving members 15, 15B have been described as to be provided so that they can be parallel with a face of the user, the revolving member can be provided so that it can be perpendicular to or oblique to the face of the user if the revolving member 15, 15B could revolve.

Although, in any of the above embodiments, the guide has been described as to be constituted of two rails 17, 18 that are arranged on upper and lower portions of the frame, the guide can be constituted of any one of the rails.

Although, in any of the above embodiments, the display units 10a, 10b have been described to slide smoothly so that they can be corresponded to a distance between eyes of the user, the display units 10a, 10b can be adjusted to slide step by step.

For example, grooves are provided on upper and/or lower surfaces of the frames 12a, 12b for every predetermined distance and the rails have stoppers (projections) corresponding to these grooves for every predetermined distance that is similar to the distance between the grooves. The stopper is made of elastic member such as a synthetic resin to make smaller a resistance occurred when the display units 10a, 10b slide.

When the user slides the display units 10a, 10b to a predetermined step so that they can be corresponded to a distance between eyes of the user, the stoppers are inserted into the grooves. This can prevent the used display units 10a, 10b from being slipping off.

Although, in the second embodiment, the end 24a-1 of the sub-arm 24a and the end 24b-1 of the sub-arm 24b have respectively described to be fixed to the frames 12a, 12b to prevent the sub-arms 24a, 24b from pitching, the end 24a-1 of the sub-arm 24a and the end 24b-1 of the sub-arm 24b can connect the frames 12a, 12b rotatively. If so, by providing guides above and under the sub-arms 24a, 24b, respectively, their pitching can be limited.

It should be understood by those skilled in the art that various modifications, combinations, sub-combinations and alternations may occur depending on design requirements and other factors insofar as they are within the scope of the appended claims or the equivalents thereof.

What is claimed is:

1. A head-mount type display device that mounts on a head of a person to operate, said device comprising:
    a first display unit configured to irradiate an enlarged image to a left eye of the person;
    a second display unit configured to irradiate the enlarged image to a right eye of the person;
    a guide that guides the first and second display units to slide the first and second display units in a longitudinal direction of the display device; and
    an adjustment mechanism that adjusts a distance between the first and second display units,
    wherein the adjustment mechanism includes:
        a revolving member which includes a shaft, which is positioned between the first and second display units, and which is rotatably mounted to the display device such that the revolving member revolves around the shaft;
        a left-side arm having a first end that rotatively connects to the first display unit at a first pivot point and a second end that rotatively connects to the revolving member at a second pivot point located at a first position that is offset from the shaft by a predetermined distance; and
        a right-side arm having a third end that rotatively connects to the second display unit at a third pivot point and a fourth end that rotatively connects to the revolving member at a fourth pivot point located at a second position that is offset from the shaft by the predetermined distance, said second position facing the first position across the shaft; and
    wherein when the revolving member revolves around the shaft, the left-side arm pivots about the first and second pivot points, the right-side arm pivots about the third and fourth pivot points, and the first and second display units each slide along the guide in the longitudinal direction by a same distance relative to the shaft.

2. The head-mount type display device according to claim 1,
    wherein the left-side arm includes a first left-side sub-arm and a second left-side sub-arm, the first left-side sub-arm extending in the longitudinal direction and having the first end that is fixed to the first display unit and a fifth end, the second left-side sub-arm having the second end that rotatively connects to the revolving member at the first position therein and a sixth end, and the fifth end of the first left-side sub-arm rotatively connecting to the sixth end of the second left-side sub-arm; and
    wherein the right-side arm includes a first right-side sub-arm and a second right-side sub-arm, the first right-side sub-arm extending in the longitudinal direction and having the third end that is fixed to the second display unit and a seventh end, the second right-side sub-arm having the fourth end that rotatively connects to the revolving member at the second position therein and a eighth end, and the seventh end of the first right-side sub-arm connecting to the eighth end of the second right-side sub-arm.

3. The head-mount type display device according to claim 1, wherein the revolving member has any one of a circular shape and an equilateral polygonal shape.

* * * * *